Nov. 16, 1965 J. F. MOTSON 3,218,497
MINIATURIZED ELECTROLUMINESCENT LAMP
Filed Oct. 10, 1962 2 Sheets-Sheet 1

INVENTOR.
JAMES F. MOTSON
BY *William E. Gleaver*
ATTORNEY

Nov. 16, 1965   J. F. MOTSON   3,218,497
MINIATURIZED ELECTROLUMINESCENT LAMP
Filed Oct. 10, 1962   2 Sheets-Sheet 2

INVENTOR.
JAMES F. MOTSON
BY
William E. Cleaver
ATTORNEY 3,218,497
MINIATURIZED ELECTROLUMINESCENT LAMP
James F. Motson, 798 Welsh Road,
Huntingdon Valley, Pa.
Filed Oct. 10, 1962, Ser. No. 229,619
4 Claims. (Cl. 313—108)

This invention relates to electroluminescent lamps and more particularly to miniaturzied electroluminescent lamps.

In certain fields of communication and data processing it is desirable to provide lighted display means, such as a matrix or pattern of lighted dots, to indicate certain data. For instance, in aerial photography it is desirable to record on each frame of film certain particulars about the aircraft which is taking the pictures, such as the direction of flight, the speed, the altitude, the attitude, etc., as well as the temperature and pressure of the atmosphere surrounding the aircraft. Heretofore this has been accomplished by mounting a small cathode ray tube within the camera housing which is attached to the aircraft so that it is facing either the front side or the reverse side of the film. A dotted raster is then formed on the cathode ray tube by signals from the monitoring transducers and according to a code, such as one of the binary codes, the information from the monitoring transducers is displayed. The dots of light on the small cathode ray tube cause a picture (pattern of dotted lights) to be made on each frame of film so that subsequently when the pictures are developed and viewed, the data from the matrix of dots help to provide a better interpretation of the pictures.

While the above system has been successfully employed, the cathode ray tube package is relatively large, relatively heavy, and produces more heat than is desirable. It is well known that any saving of space and weight in an airborne pacakage is highly desirable and hence any reduction in weight and space as related to the display device is advantageous. The saving of space and weight, as well as reducing the heat produced, is desirable in communication and data processing systems as well as airborne equipment.

Accordingly it is an object of the present invention to provide an improved miniaturized lighted display means.

It is a further object of the present invention to provide a miniaturized lighted display means which is relatively inexpensive.

It is a further object of the present invention to provide a miniaturized lighted display means which is relatively light in weight, small in size and which produces very little heat.

It is an even further object of the present invention to provide a miniaturized lighted display means which enables the user to selectively light certain portions of the display means to represent numerous patterns of discrete information.

In accordance with the present invention there is provided a plurality of elements made of electrical insulating material and which have extremely small grooves cut therein. The elements are stacked in laminated fashion so that the grooves form a pattern of tunnel-like structures according to the lighted display to be effected.

In accordance with another feature of the present invention there are a plurality of extremely small electrical conductors with one each fitted into each tunnel-like structure. The ends of each conductor protrude from both ends of its associated tunnel-like structure and the voids between the conductors and the tunnel-like structures are filled with a plastic material such as epoxy resin.

In accordance with another feature of the present invention an electroluminescent lamp, having a common transparent electrode, is bonded to protruding ends of the conductors located on one side of the tunnel-like structures such that each protruding conductor end provides a separate second electrode to operate with said common transparent electrode thereby forming a plurality of areas capable of being lighted in the electroluminescent mode.

In accordance with another feature of the present invention, in one embodiment, the protruding ends of the conductors, on the electroluminescent lamp side, are formed into small strips which when mounted together form a ribbon-like structure. These small strips are separated from each other by small shims of electrical insulating material such that the separations are virtually not discernable to the human eye thereby enabling the electroluminescent lamp to provide a fluid-like or ribbon-like flow of light.

In accordance with another feature of the present invention there is provided a conductor selection means to selectively apply electrical current to certain electrical conductors whereby predetermined lighted patterns can be effected by the electroluminescent lamp.

In accordance with another feature of the present invention in a further embodiment, the protruding ends of the conductors on the electroluminescent lamp side, are respectively connected to differently shaped conductor strips which form a plurality of second electrodes to be used with the common transparent electrode, thereby effecting differently shaped, lighted patterns.

The foregoing and other objects and features of this invention will be best understood by reference to the following description of embodiments of the invention taken in conjunction with the accompanying drawings, wherein.

Electroluminescent lamps have found utility in dashboard lighting for automobiles; in night lights for home use; in panel lights for meters, etc. Heretofore electroluminescent lighting has been employed for the purpose of lighting relatively large areas and therefore relatively large light packages and power packages were necessary.

In accordance with the present invention an electroluminescent lamp is fabricated in a miniaturized package and the individual areas which are lighted are relatively small.

Figure 1:
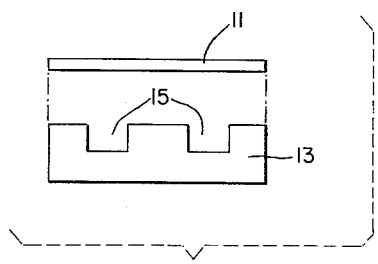
FIG. 1 is a front view of both a grooved element and an ungrooved element.

Consider FIGURE 1 which shows two elements 11 and 13 which are made of electrical insulating material such as epoxy resin, hard rubber, fiber board, etc. The element 11 is a non-grooved element while element 13 is a grooved element. The grooves 15 of element 13 are milled and in a preferred embodiment are approximately .010 of an inch in depth and width. The element 13 is about .3 of an inch in length in a preferred embodiment. Obviously the elements 11 and 13 can be of greater or lesser lengths and the grooves can be of greater or lesser depths and widths to provide more or less grooves per length of element. The number of grooves per length and the length of the building blocks (elements) depends on the type of lighting package to be fabricated.

Figure 2:
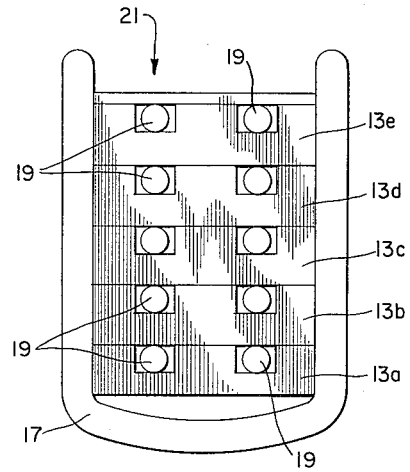
FIG. 2 is a front view of a laminated group of grooved and ungrooved elements fitted into a holder.

In order to fabricate a miniaturized package a plurality of elements or building blocks such as elements 11 and 13 are employed. As can be seen in FIGURE 2, a grooved element 13a is placed in a plastic form holder 17. In a preferred embodiment the holder 17 is made of Teflon which displays no affinity for epoxy resin, i.e., epoxy resin will not lock to Teflon. After the first element 13a is placed in the holder 17 a second element 13b is placed on top thereof. The base of element 13b forms a top for each of the grooves in element 13a and the grooves together with their respective lids or tops (bottom surface of 13b) form tunnel-like structures. As will be briefly described hereinafter the grooves may be cut to match or fit opposite another groove if the pattern requires it. The elements 13c, 13d and 13e are stacked in laminated fashion on top of element 13b. Finally element 11, without grooves, is placed on top of element 13e to complete the laminated package. The elements 13a through 13e when stacked together form a plurality of tunnel-like structures which in a preferred embodiment are each .010 of an inch wide and deep. The grooves are cut in predetermined positions so that when the elements are stacked, the tunnels form a pattern according to the display to be effected. As can be seen in FIGURE 2, the tunnel-like structures are arranged in two columns each having five tunnels.

Since the elements 13a through 13b and 11 are so small and since it is necessary to have them carefully aligned with respect to one another in order to effect the proper pattern of tunnels, these elements are assembled in a holding device 17. As mentioned earlier, in a preferred embodiment and method, the holding device 17 is made of a polyester material such as Teflon. The elements 13a through 13e and 11 are stacked in the holding device 17 and into each tunnel there is inserted a wire element 19 which has a diameter slightly less than .010 of an inch. The wires are placed in the tunnels so that the ends protrude from each of the respective tunnels.

Prior to the wires 19 being inserted into the tunnels, the entire package is encased in uncured epoxy resin. The epoxy resin fills the voids in each tunnel to form a solid package. In a preferred method the epoxy resin used is of the slow acting variety, i.e., it has a relatively long set-up time at room temperature. Epon 28 manufactured by the Shell Chemical Corporation is a typical slow acting epoxy resin. This slow acting epoxy resin is inserted into the tunnels and the wires 19 are then inserted through the epoxy resin. In this manner the wires 19 are held in place while the package is assembled. The epoxy resin is then cured to form a hard encasement with the wires 19 protruding from both ends of the package. Curing is effected by holding the package at 200° F. for one hour. The holding device 17 to which the epoxy resin will not lock is removed and the laminated package 21 has any excess or irregular epoxy resin removed. The above-mentioned curing varies in time for the various epoxy resins and in the preferred embodiment wherein Shell Epon 28 is used, curing takes 2 hours. It should be clearly understood that other epoxy resins can be used.

After the package 21 has been completely cured and separated from the holder 17, the protruding wires 19 on one end of the package are cut and a layer of electroluminescent material is bonded to the flat ends of the cut wires. In other words each wire serves as a separate electrode to operate with a common second transparent electrode (electrode 29 in FIGURE 3) as will be more fully explained hereinafter.

Figure 3:
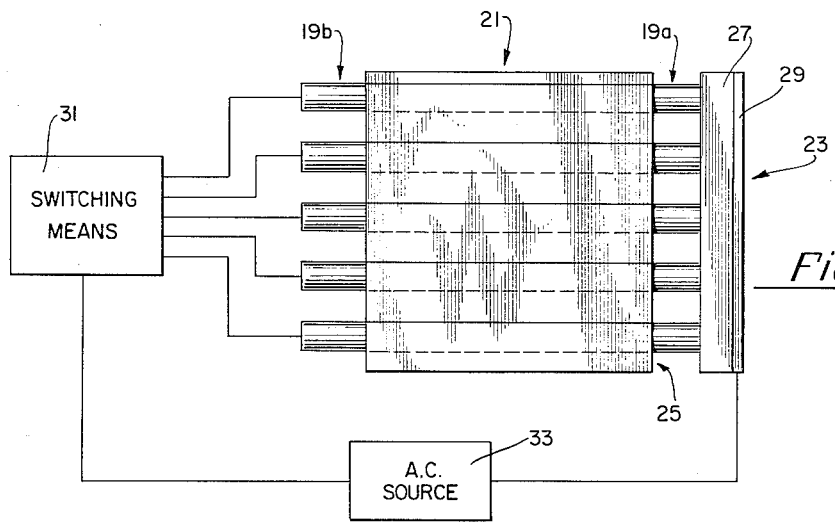
FIG. 3 is a side view of said laminated group of elements of FIG. 2 (without the holder) being further connected to both an incomplete electroluminescent lamp and a switching means.

Consider FIGURE 3 wherein the laminated package 21 is coupled to an incomplete electroluminescent lamp 23. The cut wires 19a are illustrated in exaggerated lengths to clearly show the relationship between the incomplete electroluminescent lamp 23 and the package 21. Actually the wires would be cut almost flush with the edge 25 of the package 21. A layer of electroluminescent material 27 (for example, zinc sulphide with manganese activators held in epoxy resin) is bonded to the cut wire ends 19a. A transparent electrode 29 (such as evaporated layer of gold metal) with a lead wire is bonded to the other surface of the electroluminescent material to complete the electroluminescent lamp The second electrode 29 is transparent to permit the display to be seen. The electrode 29 acts as a common electrode for each of the individual cut wire ends 19a. When an alternating current signal is applied to both the wire 19b and the common electrode 29, a spot of light is generated which is the size of the end of the wire 19 (FIGURE 2). If more than one wire 19b is energized then an equal number of spots are lighted and the electrode 29 acts as a common electrode for each of cut wire ends. As mentioned earlier the electrode 29 is a transparent electrode so that the lighted display can be seen. It should be understood that transparent electrodes made of material other than evaporated gold can be employed.

As can be seen in FIGURE 3 there is a switching means 31 connected to the wire ends 19b away from the cut ends 19a. The switching means 31 can be any well known means for selectively energizing a particular wire or particular wires such as a relay matrix, diode matrix, commutator or the like. When particular wires 19b are selected by the switching means there results a pattern of lighted areas on the electroluminescent lamp. Also in FIGURE 3 there is shown a source of alternating current power 33, which is connected between the switching means 31 and the transparent electrode 29.

Figure 4:
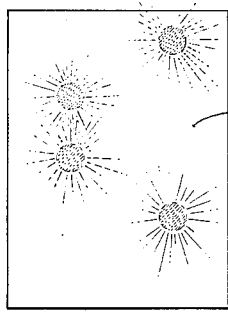
FIG. 4 is a front view of the electroluminescent lamp of FIG. 3 as seen in a lighted mode.

For purposes of illustration assume that a transducer means has read the number 69 and this number is to be displayed. The switching means 31 would energize the second and third wires in the left hand column while energizing the first and the fourth wires in the right hand column. The energization of these last-mentioned wires would result (as illustrated in FIGURE 4) in the illumination of spots opposite the second and third wires in the left hand column as well as spots opposite the first and fourth wires in the right hand column. In accordance with the well known 1–2–4–8–16 weighted binary code the illuminated spots represent the number 69. It should be clearly understood that other weighted binary codes can be employed; and types of displays other than columns and rows of lighted spots can be used.

Figure 5:
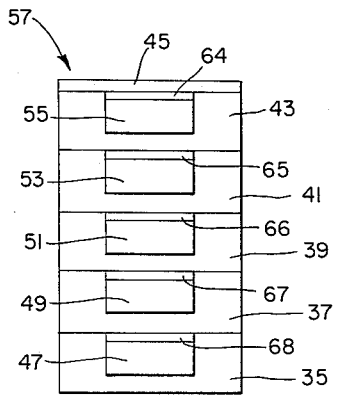
FIG. 5 is another embodiment of a laminated group of grooved and ungrooved elements with conductor ends forming a ribbon-like pattern.
Figure 6:
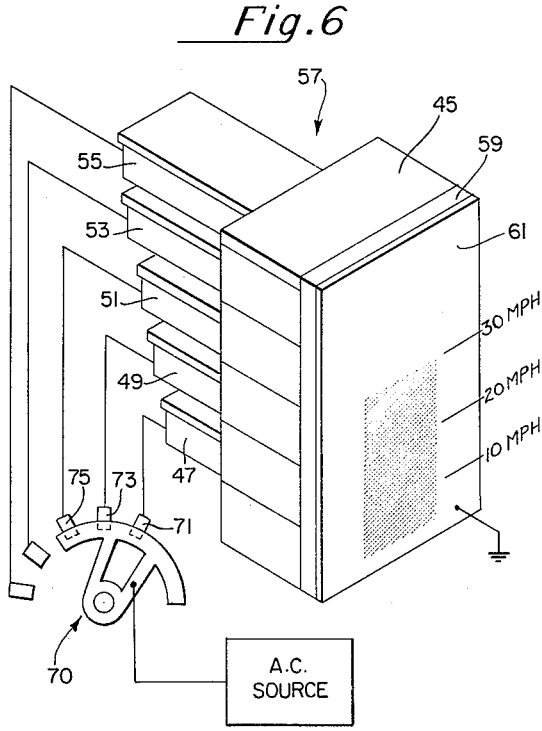
FIG. 6 is a pictorial-schematic of a device which has the conductor arrangement of FIG. 5 employed as back electrodes for an electroluminescent lamp and a switching means which together provide a flowing light effect.

FIGURES 5 and 6 illustrate other embodiment of the present invention. In FIGURE 5 there are shown five single grooved elements 35, 37, 39, 41 and 43 stacked together with a top element 45. Into each of the tunnel-like structures formed by the elements (odd-numbered) 35 through 45 there is inserted a relatively flat and wide wire (odd-numbered) 47 through 55. Assume that the package 57 is encased in epoxy resin as was package 21 and that the wires 47, 49, 51, 53 and 55 on the electroluminescent lamp side have been cut back. In a preferred embodiment these metal strips or flat wire ends are each about .008 of an inch in depth and .15 of an inch wide. Obviously the strips can have other dimensions. In between each pair of metal strips 47 through 55 there is placed an electrical insulating shim 64, 65, 66, 67 and 68. The metal strips 47 through 55 serve as individual electrodes so that when they are employed in an electroluminescent lamp each strip lights up an area which is the shape of the strip. In a preferred embodiment when an area of an electroluminescent lamp is lighted there is light fringing so that the gaps between the strips 47 and 55, or lighted areas, (the gaps being where the shims 64 through 68 are placed) are barely seen if two adjacent strips are energized. Since the light from one strip to the next appears to be continuous to the human eye, the lamp produces a flowing ribbon of light.

Assume that a strip of electroluminescent material similar to the strip 27 of FIGURE 3 and a transparent electrode similar to electrode 29 of FIGURE 3 are bonded to the wire ends or metal strips 47 through 55 of FIGURE 5. As the commutator 70, shown in FIGURE 6, engages the first three contacts 71, 73 and 75 a flowing ribbon of light advances to the third level. As illustrated in FIGURE 6 this commutator action might represent thirty miles per hour and it is clear that it could be some other scale to represent other information. By employing the embodiment of FIGURES 5 and 6, the flowing ribbon of light 77 could be moved back and forth as though it were a tape mounted on sprockets on either end of the display device.

Figure 7:
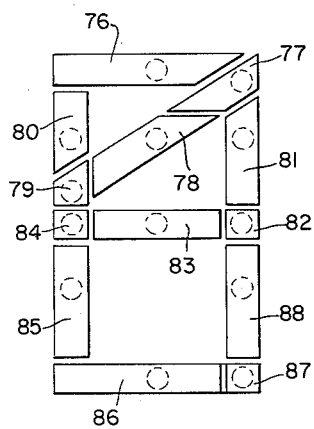
FIG. 7 is a front view of an electroluminescent light having a plurality of differently shaped back electrodes.

A third embodiment of the invention is illustrated in FIGURE 7. In FIGURE 7 there are shown a plurality of differently shaped metal strips 76 through 88 which are bonded to the wire ends of the package. The wire ends are shown as dashed lines under the differently shaped metal strips 76 through 88. The elements or building blocks (such as the elements 13 and 11 of FIGURE 1) are not shown in order to simplify the drawing.

Assume that there are properly grooved elements into which the wires of FIGURE 7 are fitted. These elements in some instances would have matching grooves. For instance to accommodate the wire for strip 77 the groove of the top element would fit or match the groove of the bottom element. It is obvious that if the different shaped strips 76 through 88 serve as second electrodes to a common transparent electrode, it will be possible to produce lighted areas according to the shapes of the strips 76 through 88. If certain strips are selectively energized then a plurality of different numbers can be displayed. For instance if the strips 77, 78, 79, 84, 83 82, 81, 88 and 87 are energized the numeral four will be displayed as a lighted area. Although the electrode arrangement of FIGURE 7 provides for displaying numerals it should be understood that other figures or patterns can be displayed.

Figure 8:
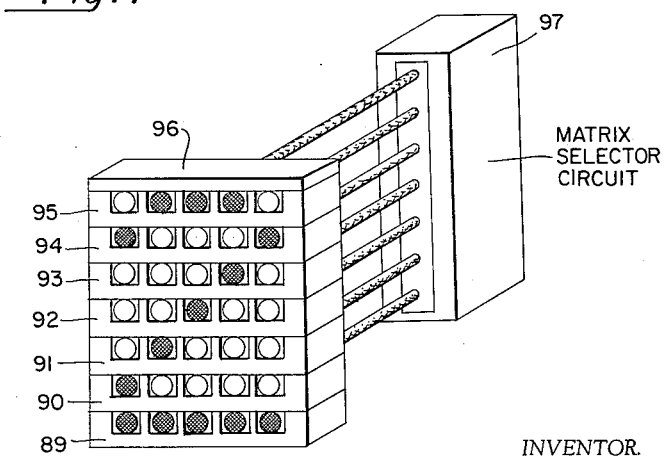
FIG. 8 is a pictorial-schematic of a matrix of back electrodes including circuitry connections to a switching circuit.

Finally a fourth embodiment of the invention is shown in FIGURE 8. If the elements 89 through 96 are mounted or stacked together to form a five by seven matrix of tunnel-like structures and the wires are inserted as before, the package can be used with an electroluminescent lamp (coupled as described above) to formulate a plurality of Arabic numbers and characters. For instance in FIGURE 8 if only the wires whose ends have been darkened are considered as energized the electroluminescent lamp would display the numeral two. Again the matrix selector circuit 97 can be any well known relay or diode matrix.

While I have described above the principles of my invention in connection with specific apparatus, it is to be clearly understood that this description is made only by way of example and not as a limitation to the scope of my invention as set forth in the objects thereof and in the accompanying claims.

What I claim is:
1. A miniaturized electroluminescent lamp display device comprising in combination:
  (a) a plurality of grooved non-electrical-conducting elements, said grooved elements being arranged in a laminated group whereby the bases of the respective elements, opposite the grooves, overlay the grooves of the adjacent elements to form tunnel-like structures;
  (b) a non-grooved member disposed next to the one of said grooved elements which is at the end of the laminated group;
  (c) a plurality of electrical conductors, each one of said conductors fitted into an associated one of said tunnel-like structures and extending from the ends thereof;
  (d) means securing said plurality of grooved elements together and securing each of said plurality of electrical conductors in its associated one of said tunnel-like structures;
  (e) an incomplete electroluminescent lamp, having one common transparent electrode and which is bonded on its side opposite from said common transparent electrode to all of said extending electrical conductors on one side of said encased laminated group of elements such that each electrical conductor serves as an individual second electrode to operate with said common transparent electrode, thereby transforming said incomplete electroluminescent lamp into a complete electroluminescent lamp and enabling said complete electroluminescent lamp to be selectively lighted in a plurality of small areas.

2. A miniaturized electroluminescent lamp display device according to claim 1 wherein there is further included a signal switching means connected to said exposed electrical conductors on the other side of said encased laminated group of elements to selectively conduct electrical current to certain portions of said electroluminescent lamp.

3. A miniaturized electroluminescent lamp display device according to claim 1 wherein said grooves are .010 of an inch wide and deep and wherein each of said conductors is less than .010 of an inch in diameter.

4. A miniaturized electroluminescent lamp display device comprising in combination:
  (a) a plurality of grooved non-electrical-conducting elements, said grooved elements being arranged in a laminated group whereby the bases of the respective elements, opposite the grooves, overlay the grooves of the adjacent elements to form tunnel-like structures;
  (b) each of said grooves being many times wider than it is deep;
  (c) a non-grooved member disposed next to the one of said grooved elements which is at the end of the laminated group;
  (d) a plurality of rectangular electrical conductors, each one of said conductors being many times wider than its is thick, each of said rectangular electrical conductors disposed in an associated one of said tunnel-like structures and extending from the ends thereof;
  (e) a plurality of non-electrical-conducting shims disposed between adjacent ones of said rectangular electrical conductors on one side of said grooves from whence they extend;
  (f) an epoxy resin encasing means filling the remaining voids in said tunnel-like structures between said rectangular electrical conductors and the walls of said tunnel-like structures and further substantially encasing the laminated group of elements,
  (g) an incomplete electroluminescent lamp, having one common transparent electrode and which is bonded on its side opposite from said common transparent electrode to all of said extending rectangular electrical conductors which are disposed on the other side of said grooves from whence they extend, each of said rectangular electrical conductors serving as an individual second electrode to operate with said common transparent electrode, thereby transforming said incomplete electroluminescent lamp into a complete electroluminescent lamp and enabling said complete electroluminescent lamp to be selectively lighted as a movable ribbon of light.

References Cited by the Examiner
UNITED STATES PATENTS

| | | | |
|---|---|---|---|
| 2,773,216 | 12/1956 | Edmonds | 315—169 |
| 3,008,065 | 11/1961 | Chamberlin. | |
| 3,026,501 | 3/1962 | Gray | 315—169 |
| 3,075,250 | 1/1963 | Strohm et al. | 264—272 |
| 3,093,448 | 6/1963 | Kirkpatrick et al. | 264—272 |

GEORGE N. WESTBY, *Primary Examiner.*

BENNETT G. MILLER, *Examiner.*